United States Patent Office 3,835,026
Patented Sept. 10, 1974

3,835,026
METHOD OF PREPARING HYDROCRACKING CATALYSTS AND PROCESS
Sinji Takase, Kawasaki, and Tomonori Shioiri, Yokohama, Japan, assignors to Nippon Oil Company, Limited, Tokyo, Japan
No Drawing. Filed Nov. 10, 1971, Ser. No. 197,365
Claims priority, application Japan, Nov. 14, 1970, 45/99,809
Int. Cl. C10g 13/02
U.S. Cl. 208—111                                4 Claims

ABSTRACT OF THE DISCLOSURE

Method of preparing hydrocracking catalysts which comprises utilizing crystalline aluminosilicate of the zeolite type with openings from about 5 to 15 A. in their largest dimension to support at least one metal of the platinum group or a compound of such metal in the proportion from about 0.01 to 20% by weight based on the metal, and thereafter halogenating the resulting aluminosilicate composition with one or more halogenated hydrocarbons containing fluorine and/or chlorine at a temperature from 0° C. to 400° C. to a halogen content from about 0.05 to 15% by weight based on the weight of the substrate, and process for hydrocracking hydrocarbons which comprises contacting such hydrocarbons with said catalyst in the presence of a hydrogen-containing gas at a pressure from normal to 200 kg./cm.$^2$ and a temperature from 150° C. to 600° C.

BACKGROUND OF THE INVENTION

1. Field of the invention

This invention relates to a method of preparing hydrocracking catalysts having very high activity and a process for hydrcracking hydrocarbons using such catalysts to produce lower-boiling hydrocarbons.

More particularly, it is concerned with a method of preparing hydrocracking catalysts which comprises utilizing crystalline aluminosilicates of the zeolite type having openings from about 5 to 15 A. in their largest dimension as a support for at least one metal of the platinum group or a compound of such metal in the proportion from about 0.01 to 20% by weight based on the metal and then halogenating the resulting aluminosilicate composition with one or more halogenated hydrocarbons containing fluorine and/or chlorine at a temperature from 0° C. to 400° C. to a halogen content from about 0.05 to 15% by weight based on the substrate, and to process for hydrocracking hydrocarbons by subjecting them to hydrocracking conditions in the presence of at least one such catalyst in the presence of a hydrogen-containing gas at an elevated temperature to produce lower-boiling hydrocarbons.

2. Description of the prior art

Catalysts heretofore used for the hydrocracking generally comprised composite containing one moiety capable of performing hydrogenating function and another capable of performing cracking function. Metals of Group VIII, Group VI and Group IB and oxides or sulfides thereof and the like have been employed for hydrogenation. The components utilized for their cracking function include acidic oxides such as, for example, silica-alumina, silica-magnesia, silica-zirconia, silica-boria, silica-titania-zirconia, silica-alumina-magnesia, alumina-boria, boron fluoride-alumina and the like. These catalysts have not proved to be completely satisfactory. Some of them are sensitive to impurities in the starting material such as organic nitrogen compounds and the others do not have sufficiently high activity. Still others lose their activity so rapidly that processes which use them must be frequently interrupted to regenerate the catalyst.

Recently, crystalline aluminosilicates of the zeolite type with large openings have been widely used for the cracking process because of their high activity and high yields compared with the silica-alumina catalysts previously utilized. Compositions containing at least one metal of the platinum group or a compound thereof supported on crystalline aluminosilicates of the zeolite type have been considered superior in hydrocracking activity and selectivity compared to such prior catalysts as silica-alumina and the like. However, there is still not complete satisfaction with the use of crystalline aluminosilicate of the zeolite type alone as the component for cracking.

It has been known with catalysts for hydrocracking to introduce halogen in a variety of forms in order to activate the same. For example, halogens have been introduced from aqueous solutions of HCl, HF, NH$_4$F or the like. Suitable processes are described, for example, in Japanese Patent Publication 12,319/1963 which utilizes alumina plus Cl$^-$ ion, Japanese Patent Publication 22,261/1963 which utilizes silica-magnesia plus F$^-$ ion, and Japanese Patent Publication 318/1968 which utilizes silica-alumina plus F$^-$ ion. In a few cases, see for example, Japanses Patent Publication 22,369/1965, fluorine is introduced into silica/titania-zirconia using BF$_3$ or SiF$_4$. The catalysts with halogens introduced by these procedures, however, do not exert satisfactory activities. On the other hand, although it is known to halogenate alumina, silica-alumina and like substrates with a halogenated hydrocarbon, no successful case as with alumina is found with silica-alumina carrier which is widely used for hydrocracking. The crystalline aluminosilicates of the zeolite type, so far as is known, have not been halogenated with halogenating agents such as alkyl halides.

SUMMARY OF THE INVENTION

It is an object of this invention to provide a method of preparing catalysts of superior activity by halogenating crystalline aluminosilicates of the zeolite type supporting metals of the platinum group or compounds thereof.

It has now been discovered that halogenated hydrocarbons including CHClF$_2$, CCl$_2$F$_2$ and CCl$_4$ may be reacted with crystalline aluminosilicates of zeolite type, supporting a metal of the platinum group such as platinum or palladium or a compound thereof capable of performing hydrogenation function, under selected conditions to introduce halogens into the latter. The catalytic compositions thus obtained are characterized by their outstanding catalytic activities in hydrocracking of hydrocarbons.

According to one aspect of the invention, hydrocracking catalysts are prepared by a method which comprises bringing crystalline aluminosilicates of zeolite type with openings from 5 to 15 A. and supporting at least one metal of the platinum group or a compound thereof into contact with selected halogenated hydrocarbons containing fluorine and/or chlorine to produce catalysts having a halogen content from about 0.05 to 15% by weight based on the substrate. According to another aspect of the invention, hydrocarbons are hydrocracked by subjecting them to hydrocracking conditions in the presence of at least one of the novel catalysts of the invention together with hydrogen or a hydrogen-containing gas to produce lower-boiling hydrocarbons.

DESCRIPTION OF THE INVENTION

The crystalline aluminosilicates used in this invention have openings of about 5 A. or larger in effective size so as to not hinder the entrance and exit of the starting and produced gases. Those of the same basic structure as in natural Faujasite and Mordenite with larger openings, for example, are preferred. Zeolites of X type, zeolites of Y type and synthetic Mordenite as well as products from treatment of natural Mordenite are commercially available. Normally they contain $Al_2O_3$ and $Na_2O$ in equimolar quantities although the natural products may vary somewhat depending upon the region from which they are obtained. They may be utilized as acquired. If higher activities are desired, it is preferable to replace at least some of the sodium with hydrogen or with one or more divalent or higher metal ions. This may be accomplished by conventional means as by exchanging all or part of the sodium with ammonia, hydrochloric acid or the like followed by treatment with a small amount of the selected divalent or higher metal ions. Typically useful divalent or higher metal ions include Mg, Ca, Sr, Ba, Zn, Cd, Mn, Ni, Co, Cu, Al, rare earth metals and the like. The ratio of the exchange is at least about 50%, and in preferred catalysts it is at least 80%. The ratio may be measured by absorption spectrophotometry and represents a ratio of the number of sodium atoms replaced with hydrogen or polyvalent metal atoms to the number of sodium atoms originally present.

Metals of the platinum group such as platinum, palladium, rhodium or iridium or compounds thereof are placed on the substrate by the conventional procedures, such as impregnation or ion exchange. The compounds may be oxidation, reduction or sulfidation products. The amount of the metal or compound additive is preferably about 0.01 to 20% by weight in terms of the metal on the basis of the crystalline aluminosilicate of zeolite type. A bonding agent such as bentonite may be incorporated if desired before utilizing such molding procedures as extrusion or tabletting. Products containing less than 0.01% by weight are generally unsatisfactory, whereas those containing more than about 20% by weight are not economical.

The halogenated hydrocarbons used in this invention are hydrocarbon compounds in which one or more of the hydrogens are substituted with chlorine and/or fluorine. Typically useful compounds include $CH_2Cl_2$, $CHCl_3$, $CCl_4$, $CH_2F_2$, $CHF_3$, $CF_4$, $CH_2ClF$, $CHClF_2$, $CHCl_2F$, $CClF_3$, $CCl_3F$, $CCl_2F$—$CClF_2$, $C_6H_5F$ and the like. Halogenation is preferably effected in the vapor phase. For that reason compounds containing from one to about six carbon atoms are preferred since they are most readily vaporized.

To illustrate an embodiment of the halogenation method, a crystalline aluminosilicate of the zeolite type which supports a metal or a compound thereof capable of performing hydrogenating function is thoroughly dried under such as gas as hydrogen, nitrogen, oxygen or air at 350–550° C. for two hours or longer and, while maintaining a predetermined temperature, contacted with at least one of the halogenated hydrocarbon mentioned above, preferably in association with a non-reducing gas such as nitrogen, oxygen or air for a predetermined period of time and then with the non-reducing gas alone in order to expel the unreacted materials. The product is cooled and stored under moisture-proof conditions. The reaction may be conducted either in a flowing reaction tube or in a closed vessel. The halogen content can be adjusted by control of the reaction temperature and the amount of halogenating agent employed. The halogen content is adjusted to about 0.05 to 15% by weight since there is little advantage in increasing the halogen content above this level.

The selected halogenation temperature is an important feature of this invention. Generally at increased temperatures more halogen is introduced in a given period of time. However too high a temperature will result in destruction of the crystalline aluminosilicate to produce products with little or no activity. Moreover, certain of the metals or compounds thereof capable of performing the hydrogenating function may react with the halogenating agent to form low boiling compounds which are lost by volatilization. Therefore, the halogenation temperature is preferably as low as is consistent with obtaining reaction. Normally this is in the range from about 0 to 400° C., preferably from 100° to 300° C.

The optimum method of control will depend upon the halogen content desired and the nature of the halogenating agent, since the halogenating agents individually differ in reactivity with crystalline aluminosilicate. Certain of them are reactive at relatively low temperatures at which others have little tendency to react. In practice, it is preferred to use the most active halogenating agents. The preferred halogenating agents are $CH_2Cl_2$, $CHCl_3$, $CCl_4$, $CHClF_2$, $CCl_2F_2$, $CClF_2$—$CClF_2$, $C_6H_5F$.

The hydrocracking reaction of hydrocarbons by the use of the catalyst preferred according to the invention is carried out under the following conditions. The reaction temperature may vary from about 150 to 600° C., preferably from 200 to 550° C.; the reaction pressure is from about normal to 200 kg./cm.$^2$, preferably from normal to 150 kg./cm.$^2$; the space velocity is from about 0.50 to 20.0 wt./wt./hr., preferably from 0.1 to 10.0 wt./wt./hr.; the volume ratio of hydrogen to hydrocarbon is preferably from 100 to 4,000 l./l. The hydrocarbons used in the invention include ordinary hydrocarbons, particularly petroleum hydrocarbons such as naphtha, kerosene, light oil or vacuum distillation-distillate oil.

The catalysts of this invention manifest improved activity in hydrocracking, superior resistance to organic nitrogen and reduced formation of coke.

DESCRIPTION OF PREFERRED EMBODIMENTS

The present invention will be described in more detail by the examples given below.

EXAMPLE 1

Experiment 1

In an aqueous solution of calcium nitrate at a molar concentration of 0.05 were placed 100 g. of commercially available zeolite molecular sieve of Na-Y type and the mixture was heated with stirring at 80° C. for about 2 hours for the ion exchange.

The procedure were repeated seven times to exchange 92% by weight of the original sodium with calicum. Then, the Ca—Y was transferred into an aqueous solution conatining $[Pt(NH_3)_4]^{++}$ ions prepared by adding to $K_2PtCl_4$ a large excess of ammonia to bring the carrier to carrying platinum as much as about 0.5% by weight. The resulting mass was washed with water and, following addition of about 20% by weight of a bonding agent, molded, dried and calcinated at 500° C. The product is referred to as Catalyst A.

Experiment 2

A quartz reaction tube was filled with 10 g. of Catalyst A, and the catalyst was dried and reduced under hydrogen at 450° C. for 3 hours and then cooled to 200° C. A gaseous mixture of nitrogen and carbon tetrachloride which was obtained by passing nitrogen gas through carbon tetrachloride kept at 0° C. was passed over the catalyst maintained at 200° C. at a flow rate of 100 ml./min. for 2 minutes. Additional nitrogen gas was then passed over the product for about 1 hour, and the resulting catalyst was stored in a moisture-proof vessel. Chlorine in the catalyst was analyzed to be 3.28% by weight. The product is referred to as Catalyst B.

Experiment 3

In a quartz reaction tube were placed 10 g. of Catalyst A in Experiment 1, and the catalyst was dried and reduced under hydrogen at 500° C. for 3 hours and then cooled to 175° C. $CHClF_2$ was passed over the catalyst maintained at 175° C. at a flow rate of 50 ml./min. together with nitrogen gas at a flow rate of 100 ml./min. for 30 minutes. Nitrogen gas was flowed for about 1 hour after the reaction and the resulting catalyst was stored in a moisture-proof vessel. Chlorine and fluorine in the catalyst were analyzed to be 0.66% by weight and 0.44% by weight, respectively. The product is referred to as Catalyst C.

Experiment 4

In a quartz reaction tube were placed 10 g. of Catalyst A in Experiment 1, and the catalyst was dried and reduced under hydrogen at 400° C. for 2 hours and then cooled to 250° C. $CCl_2F_2$ was passed over the catalyst maintained at 250° C. at a flow rate of 50 ml./min. together with nitrogen gas at a flow rate of 100 ml./min. for 10 minutes. Nitrogen gas alone was then passed for additional about 1 hour and the resulting catalyst was stored in a moisture-proof vessel. Chlorine and fluorine in the catalyst were analyzed to be 0.93% by weight and 0.32% by weight, respectively. The product is referred to as Catalyst D.

EXAMPLE 2

Comparative hydrocracking of n-hexadecane was conducted under the identical conditions respectively using the catalysts shown in Experiments 1–3 of Example 1. The reaction conditions are as follows:

Reaction pressure _____kg./cm.² G__ 40
Reaction temperature _____° C__ 260
WHSV _____g./g./hr__ 2
Molar ratio of hydrogen to hydrocarbon
                                          mole/mole__ 6
Amount of the catalyst _____g__ 5

Results of gaschromatographic analyses of the products 4 hours after initiation of supply of the starting material are shown in Table 1.

TABLE 1

| Catalyst | A | B | C |
|---|---|---|---|
| Products (mole percent): | | | |
| Propane | 0.40 | 0.65 | 0.69 |
| iso-Butane | 2.08 | 5.11 | 6.26 |
| n-Butane | 1.18 | 2.31 | 2.61 |
| iso-Pentane | 6.60 | 11.79 | 13.90 |
| n-Pentane | 1.92 | 3.15 | 3.15 |
| iso-Hexane | 7.22 | 11.10 | 11.07 |
| n-Hexane | 1.81 | 2.80 | 2.58 |
| iso-Heptane | 6.99 | 16.88 | 19.60 |
| n-Heptane | 1.21 | 3.53 | 3.63 |
| iso-Octane | 11.22 | 12.11 | 12.82 |
| n-Octane | 2.12 | 2.77 | 2.39 |
| Nonane | 10.13 | 10.40 | 10.79 |
| Decane | | | |
| Undecane | 15.75 | 13.60 | 8.92 |
| Dodecane | | | |
| Tridecane | | | |
| Tetradecane | 16.39 | 2.50 | 0.95 |
| Pentadecane | | | |
| iso-Hexadecane | | | |
| n-Hexadecane | 14.98 | 1.12 | 0.64 |

Table 1 indicates that halogenated catalysts B and C are superior in cracking activity to non-halogenated catalyst A.

EXAMPLE 3

In 1.5 liters of 10% aqueous solution of $NH_4NO_3$ were placed 200 g. of commercially available zeolite molecular sieve of Na—Y type and the mixture was heated with stirring at 90° C. for about 2 hours for the ion exchange. The procedures were repeated nine times followed by another exchange using 1.5 liters of 10% aqueous solution of $Mg(NO_3)_2$ to exchange 88% of the original sodium with $NH_4^+$ and $Mg^{++}$. Then, the resulting mass was transferred into an aqueous solution containing $$[Pd(NH_3)_4]^{++}$$

ions to bring the carrier to carrying palladium as much as about 0.5% by weight. The catalyst was washed with water and, following addition of bonding agent as much as about 20% by weight, molded, dried at 120° C. and calcinated at 500° C. The resulting catalyst is referred to as Catalyst E.

In a quartz reaction tube were placed 10 g. of Catalyst E, and the catalyst was dried and reduced under hydrogen at 500° C. for 3 hours and then cooled to 200° C. $CHClF_2$ was passed over the catalyst maintained at 200° C. at a flow rate of 50 ml./min. together with nitrogen gas at a flow rate of 100 ml./min. for 10 minutes. Nitrogen gas was passed for about 1 hour after the reaction and the resulting catalyst was stored in a moisture-proof vessel. Chlorine and fluorine in the catalyst were aanlyzed to be 0.60% by weight and 0.44% by weight, respectively. The product is referred to as Catalyst F.

In order to make comparison between Catalyst E and Catalyst F hydrocracking of N-hexadecane was conducted under the identical conditions. The results are shown in Table 2. The reaction conditions are as follows:

Reaction pressure _____kg./cm.² G__ 40
Reaction temperature _____° C__ 230
WHSV _____g./g./hr__ 5
Molar ratio of hydrogen to hydrocarbon
                                          mole/mole__ 6
Amount of the catalyst _____g__ 5

TABLE 2

| Catalyst | E | F |
|---|---|---|
| Product (mole percent): | | |
| Butane | 0.55 | 0.74 |
| iso-Pentane | 1.79 | 2.70 |
| n-Pentane | 0.64 | 0.60 |
| iso-Hexane | 3.83 | 5.63 |
| n-Hexane | 1.20 | 1.00 |
| iso-Heptane | 12.88 | 17.82 |
| n-Heptane | 3.10 | 2.28 |
| iso-Octane | 13.16 | 21.79 |
| n-Octane | 3.18 | 2.19 |
| iso-Nonane | 11.31 | 15.76 |
| n-Nonane | 2.23 | 1.11 |
| iso-Decane | 9.70 | 9.65 |
| n-Decane | 1.36 | 0.61 |
| Undecane | 8.55 | 4.94 |
| Dodecane | 4.42 | 3.27 |
| Tridecane | | |
| Tetradecane | 12.18 | 6.72 |
| Pentadecane | | |
| iso-Hexadecane | | |
| n-Hexadecane | 9.92 | 3.19 |

Table 2 indicates that halogenated catalyst F exerts a higher activity than with non-halogenated catalyst E.

EXAMPLE 4

In order to compare the hydrocracking activity between non-halogenated catalyst A and halogenated catalyst D hydrocracking of gas oil was conducted.
Properties of the starting oil were as follows:

$d_4^{15}$ _____ 0.8338
IBp _____° C__ 235
10% _____° C__ 254
50% _____° C__ 278
90% _____° C__ 318
95% _____° C__ 332
Ep _____° C__ 342
Sulfur content _____wt. percent__ 0.31

The reaction conditions were adjusted in such a manner that a ratio of decomposition of 20–30% was obtained with either catalyst. The reaction conditions and properties of the products are shown in Table 3.

TABLE 3.—HYDROCRACKING OF GAS OIL

| Catalyst | A | D |
|---|---|---|
| Reaction condition: | | |
| Pressure, kg./cm.$^2$ G | 50 | 50 |
| Temperature, °C | 380 | 310 |
| LHSV, v./v./hr | 1 | 1 |
| H$_2$/oil, liter/liter | 2,000 | 2,000 |
| Distribution of products, vol., percent: | | |
| C$_1$–C$_2$ | 0.07 | 0.05 |
| C$_3$ | 2.11 | 1.83 |
| i-C$_4$ | 4.66 | 6.22 |
| n-C$_4$ | 6.37 | 5.00 |
| 25–125° C | 11.67 | 8.92 |
| 125–210° C | 10.30 | 16.70 |
| Over 210° C | 77.70 | 76.10 |
| Total | 112.88 | 114.82 |
| Octane value (F-1): | | |
| Distillate boiling below 125° C | 81 | 80 |
| Distillate boiling between 125–210° C | 64 | 62 |
| Composition of the distillate boiling between 125–210° C. (FIA method): | | |
| Saturated | 54.0 | 58.0 |
| Unsaturated | 3.0 | 4.0 |
| Aromatic | 43.0 | 38.0 |

The data in Table 3 according to which difference in reaction temperature between Catalyst A and Catalyst D for yielding similar decomposition products is approximately 70° C. sufficiently indicate the effect of halogenation.

We claim:

1. A process for hydrocracking hydrocarbons which comprises contacting a starting hydrocarbon with a catalyst in the presence of a hydrogen-containing gas at a pressure from about normal to 200 kg./cm.$^2$ and a temperature from about 150° C. to 600° C., said catalyst being produced prior to contacting the starting hydrocarbon by halogenating a substrate comprising a crystalline aluminosilicate of zeolite type with openings from 5 to 15 A. in their largest dimension and supporting a metal of the platinum group or a compound thereof in the proportion from about 0.01 to 20% by weight in terms of the metal with at least one halogenated hydrocarbon in which the halogen is selected from the group consisting of fluorine and chlorine, at a temperature of from about 0° to about 400° C. to a halogen content from about 0.05 to 15% by weight on the basis of the substrate.

2. A process as in Claim 1 wherein the aluminosilicate is a sodium aluminosilicate which contains equimolar quantities of Al$_2$O$_3$ and Na$_2$O.

3. A process as in Claim 2 wherein at least a portion of the sodium atoms have been exchanged for a member selected from the group consisting of hdrogen, metal atoms, and mixtures thereof, the exchange ratio being at least about 50%.

4. A process as in Claim 3 wherein the exchange ratio is at least 80%.

References Cited
UNITED STATES PATENTS

| | | | |
|---|---|---|---|
| 3,316,169 | 4/1967 | Peck et al. | 208—111 |
| 3,318,802 | 5/1967 | Martin | 208—111 |
| 3,440,300 | 4/1969 | Estes et al. | 252—441 |
| 3,551,516 | 12/1970 | Ashley et al. | 252—441 |
| 3,691,255 | 9/1972 | Takase et al. | 252—455 Z |
| 3,699,056 | 10/1972 | Takase et al. | 252—455 Z |
| 3,449,264 | 6/1969 | Myers | 252—441 |
| 3,607,728 | 9/1971 | Wilhelm | 208—111 |
| 3,318,802 | 5/1967 | Martin | 208—111 |

DELBERT E. GANTZ, Primary Examiner

J. W. HELLWEGE, Assistant Examiner

U.S. Cl. X.R.

252—442

UNITED STATES PATENT OFFICE
CERTIFICATE OF CORRECTION

Patent No. 3,835,026      Dated September 10, 1974

Inventor(s) Sinji Takase et al.

It is certified that error appears in the above-identified patent and that said Letters Patent are hereby corrected as shown below:

Column 3, line 43, after "$CClF_3$,", first occurrence, insert -- $CCl_2F_2$ --; same line 43, "$CCl_2F$-$CClF_2$" should read -- $CClF_2$-$CClF_2$ --. Column 4, line 15, "preferred" should read -- prepared --; line 20, "0.50" should read -- 0.05 --. Column 6, line 23, "5" should read -- 0.25 --.

Signed and sealed this 14th day of January 1975.

(SEAL)
Attest:

McCOY M. GIBSON JR.
  Attesting Officer

C. MARSHALL DANN
  Commissioner of Patents